(12) United States Patent  
Saito et al.

(10) Patent No.: US 12,524,012 B2
(45) Date of Patent: Jan. 13, 2026

(54) ROUTE GENERATION METHOD, ROUTE GENERATION SYSTEM, AND ROUTE GENERATION PROGRAM

(71) Applicant: Yanmar Holdings Co., Ltd., Osaka (JP)

(72) Inventors: Masafumi Saito, Okayama (JP); Keisuke Iwamura, Okayama (JP)

(73) Assignee: YANMAR HOLDINGS CO., LTD., Osaka (JP)

( * ) Notice: Subject to any disclaimer, the term of this patent is extended or adjusted under 35 U.S.C. 154(b) by 210 days.

(21) Appl. No.: 18/237,613

(22) Filed: Aug. 24, 2023

(65) Prior Publication Data

US 2024/0069556 A1    Feb. 29, 2024

(30) Foreign Application Priority Data

Aug. 25, 2022   (JP) .................. 2022-133870

(51) Int. Cl.
*A01B 69/00*   (2006.01)
*A01B 69/04*   (2006.01)
*G05D 1/00*   (2006.01)

(52) U.S. Cl.
CPC ......... *G05D 1/0219* (2013.01); *A01B 69/008* (2013.01); *G05D 1/0044* (2013.01); *G05D 1/0088* (2013.01); *G05D 1/0278* (2013.01)

(58) Field of Classification Search
CPC ...... A01B 69/00; A01B 69/008; G01C 21/20; G05D 1/0219; G05D 2105/15; G05D 1/648; G05D 2107/21; G05D 2109/10; G05D 1/0044; G05D 1/0088; G05D 1/0278; B60W 60/001; B60W 2300/15
See application file for complete search history.

(56) References Cited

U.S. PATENT DOCUMENTS

2020/0288622 A1    9/2020    Nishii

FOREIGN PATENT DOCUMENTS

JP    2020-054318 A    4/2020

OTHER PUBLICATIONS

WO 2020039782 A1 with English translation; date filed Jul. 10, 2019; date published Feb. 27, 2020. (Year: 2020).*
1 European Search Report dated Dec. 8, 2023 issued in EP Application No. 23190340.2.

* cited by examiner

*Primary Examiner* — Calvin Cheung
(74) *Attorney, Agent, or Firm* — NORTON ROSE FULBRIGHT US LLP

(57) ABSTRACT

The generation processing part generates the target route including a plurality of straight routes arranged at equal interval spacing, based on the reference line which passes through point A and point in the field. In a case of changing the orientation of the target route, the change processing part maintains the interval spacing of each of the plurality of straight routes.

10 Claims, 12 Drawing Sheets

ROUTE GENERATION METHOD, ROUTE GENERATION SYSTEM, AND ROUTE GENERATION PROGRAM

CROSS-REFERENCE TO RELATED APPLICATIONS

This application claims priority under 35 U.S.C. § 119 to JP Application No. 2022-133870 filed Aug. 25, 2022 the entire contents of which are hereby incorporated by reference.

TECHNICAL FIELD

The present invention relates to a route generation method, a route generation system, and a route generation program for generating a target route to cause a work vehicle travel autonomously in a field.

BACKGROUND ART

Conventionally, a technique of generating a target route to cause a work vehicle to travel autonomously in a field has been known. For example, a technique, wherein a first location (a reference start point) and a second location (a reference end point) in a field are obtained, and a line segment that connects the reference start point and the reference end point is registered as a reference line, and then a plurality of parallel straight routes (a target route) according to a work width are set for the reference line, and a work vehicle is made to travel autonomously along the straight routes, has been known (for example, see Patent Document 1).

PRIOR ART DOCUMENT

Patent Document

Patent Document 1: Japanese Unexamined Patent Application Publication No. 2020-54318

SUMMARY OF INVENTION

Technical Problem

In these instances, while a work vehicle is traveling autonomously, there is a case in which it is desired to change the travel direction of the target route according to field conditions, traveling status, etc. In this case, for example, in a case where the target route is configured with a plurality of straight routes parallel to a reference line, if the orientation of the straight route the work vehicle is currently traveling on is changed, then the orientation of all straight routes is changed accordingly, and thus the interval spacing between each of the plurality of straight routes is changed (see FIG. 9, which is described below). If the interval spacing between each of the plurality of straight routes changes, the interval spacing does not match the work width of the work vehicle, which makes it difficult to make the work vehicle travel autonomously in an appropriate manner.

The object of the present invention is to provide a route generation method, a route generation system, and a route generation program capable of causing a work vehicle to travel autonomously in an appropriate manner even in a case where the orientation of a target route including a plurality of straight routes is changed.

Solution to Problem

The route generation method according to the present invention is a route generation method for executing: generating a target route, based on a reference line which passes through a first reference point and a second reference point within a work area, the target route including a plurality of straight routes arranged at equal interval spacing; and, maintaining the interval spacing of each of the plurality of straight routes in a case where an orientation of the target route is changed, at the same length as the interval spacing of the target route before the change in orientation.

The route generation system according to the present invention includes a generation processing part and a change processing part. The generation processing part generates a target route, based on a reference line which passes through a first reference point and a second reference point within a work area, the target route including a plurality of straight routes arranged at equal interval spacing. The change processing part maintains the interval spacing of each of the plurality of straight routes in a case where an orientation of the target route is changed, at the same length as the interval spacing of the target route before the change in orientation.

The route generation program according to the present invention is a route generation program for causing one or a plurality of processors to execute: generating a target route, based on a reference line which passes through a first reference point and a second reference point within a work area, the target route including a plurality of straight routes arranged at equal interval spacing; and, maintaining the interval spacing of each of the plurality of straight routes in a case where an orientation of the target route is changed, at the same length as the interval spacing of the target route before the change in orientation.

Advantageous Effects of Invention

According to the present invention, it is possible to provide a route generation method, a route generation system, and a route generation program capable of causing a work vehicle to travel autonomously in an appropriate manner even in a case where the orientation of a target route including a plurality of straight routes is changed.

DESCRIPTION OF EMBODIMENTS

The following embodiment is one specific example of the present invention, and is not intended to limit the technical scope of the present invention.

Figure 1:
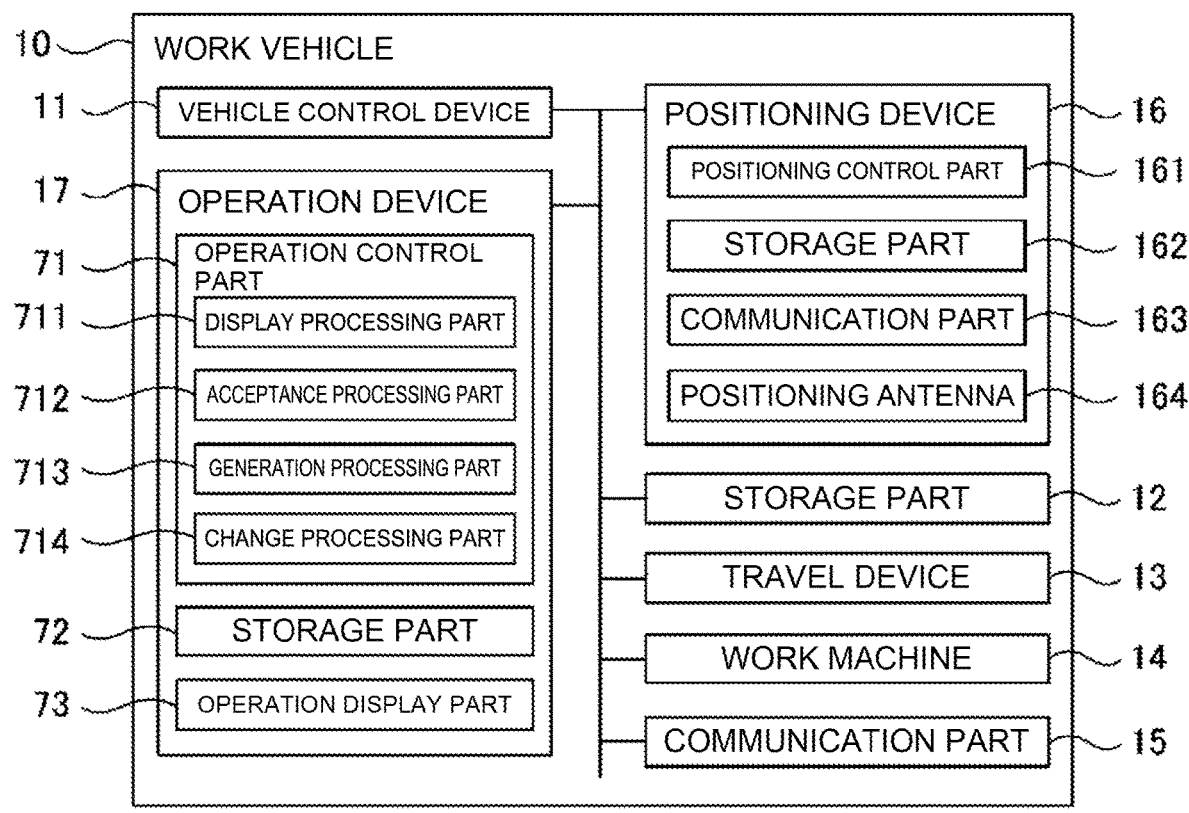
FIG. 1 is a block diagram illustrating a configuration of a work vehicle according to an embodiment of the present invention.
Figure 2:
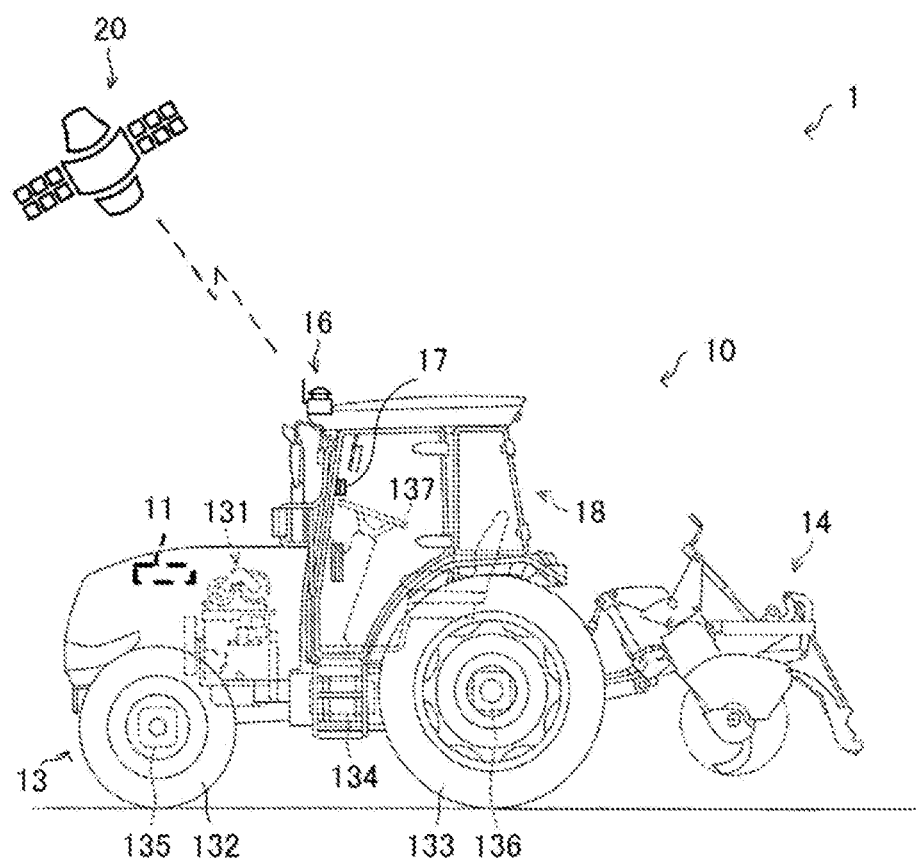
FIG. 2 is an external view diagram illustrating an example of the work vehicle according to the embodiment of the present invention.

As illustrated in FIG. 1 and FIG. 2, the autonomous travel system 1 according to an embodiment of the present invention includes the work vehicle 10, the satellite 20, and a base station (not illustrated). In the present embodiment, a case where the work vehicle 10 is a tractor is described as an example. Note that a rice transplanter, a combine harvester, a construction machine, a snowplow, or the like are also possible embodiments of the work vehicle 10. In response to an operator's (a user's) operation, the work vehicle 10 performs predetermined work (for example, tilling work) while traveling along the target route R in the field F (see FIG. 4). In particular, the work vehicle 10 performs straight traveling on the target route R in accordance with autonomous steering and performs turning traveling in accordance with manual steering (a driving operation) by the operator. The work vehicle 10 travels in the field F and performs work while switching between autonomous travel on straight routes and manual travel on turning routes. The target route R may be generated in advance based on the operator's operations and stored as route data.

Figure 4:
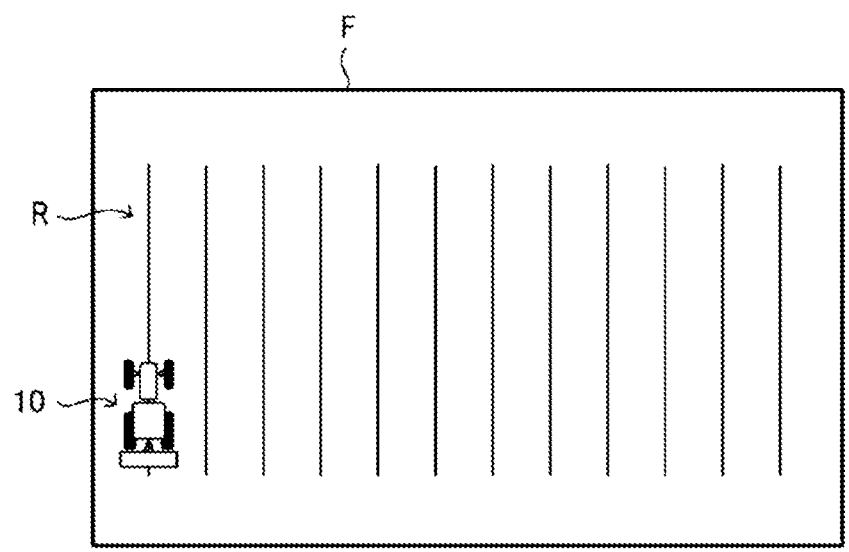
FIG. 4 is a diagram illustrating an example of a target route of the work vehicle according to the embodiment of the present invention.

The work vehicle 10 travels in the field F illustrated in FIG. 4, for example, repeating straight traveling and turning traveling until the work is finished. The plurality of straight routes are approximately parallel to one another. The target route R illustrated in FIG. 4 is one example; the target route R is determined appropriately according to the size of the work vehicle 10, the size of the work machine 14 (the work width), the work content, the shape of the field F, etc.

Note that, the autonomous travel system 1 may include an operation terminal (a tablet device, a smartphone, etc.) which is operated by the operator. The operation terminal can communicate with the work vehicle 10 via a communications network such as a cellular telephone line network, a packet line network, or a wireless LAN. For example, the operator operates the operation terminal to register each type of information (such as work vehicle information, field information, work information, etc.) and the like. Further, the operator can confirm the traveling status, working status, etc., of the work vehicle 10 at a location distant from the work vehicle 10 with the traveling trajectory displayed on the operation terminal.

[Work Vehicle 10]

As illustrated in FIG. 1 and FIG. 2, the work vehicle 10 is equipped with the vehicle control device 11, the storage part 12, the travel device 13, the work machine 14, the communication part 15, the positioning device 16, and the operation device 17. The vehicle control device 11 is electrically connected to the storage part 12, the travel device 13, the work machine 14, the positioning device 16, the operation device 17, and the like. Note that, the vehicle control device 11 and the positioning device 16 may be capable of wireless communication. Further, the vehicle control device 11 and the operation device 17 may be capable of wireless communication.

The communication part 15 is a communication interface that connects the work vehicle 10 to a communication network by cable or wirelessly, in order to execute data communication according to a predetermined communication protocol with external devices (such as the operation terminal) via the communication network.

The storage part 12 is a non-volatile storage part such as an HDD (Hard Disk Drive) or an SSD (Solid State Drive) that stores various types of information. Control programs, such as an autonomous travel program to cause the vehicle control device 11 to execute the autonomous travel process described hereinafter (see FIG. 13), are stored in the storage part 12. For example, the autonomous travel program is non-transiently recorded on a computer-readable recording medium such as a CD or a DVD, which is read by a predetermined reading device (not illustrated) and stored in the storage part 12. Note that, the autonomous travel program may be downloaded from a server (not illustrated) to the work vehicle 10 via a communication network and stored in the storage part 12. Further, the storage part 12 may also store the data of the target route R that is generated in the operation device 17.

The travel device 13 is a driving part that causes the work vehicle 10 to travel. As illustrated in FIG. 2, the travel device 13 is equipped with the engine 131, the front wheels 132, the rear wheels 133, the transmission 134, the front axle 135, the rear axle 136, the steering wheel 137, etc. Note that the front wheels 132 and the rear wheels 133 are installed on both the left side and the right side of the work vehicle 10. Further, the travel device 13 is not limited to the wheel type equipped with the front wheels 132 and the rear wheels 133, and may be a crawler type equipped with crawlers installed on both the left side and the right side of the work vehicle 10.

The engine 131 is a drive source such as a diesel engine or a gasoline engine driven using fuel that is supplied by a fuel tank, which is not illustrated. The travel device 13 may also be equipped with an electric motor as a drive source, either together with the engine 131 or instead of the engine 131. Note that a power generator, which is not illustrated, is connected to the engine 131, and electric power is supplied from the power generator to the electrical components such as the vehicle control device 11 installed in the work vehicle 10, the battery, and the like. Note that the battery is charged by the power supplied from the power generator. Additionally, the electrical components such as the vehicle control device 11, the positioning device 16, the operation device 17, and the like installed in the work vehicle 10 can be driven by the power supplied from the battery even after the engine 131 is stopped.

The driving force of the engine 131 is transmitted to the front wheels 132 via the transmission 134 and the front axle 135, and to the rear wheels 133 via the transmission 134 and the rear axle 136. Further, the driving force of the engine 131 is also transmitted to the work machine 14 via the PTO shaft (not illustrated). The travel device 13 performs a travel action according to a command from the vehicle control device 11.

The work machine 14 may be, for example, a tiller, a seeder, a mower, a plow, a fertilizer applicator, or the like, which can be attached to and detached from the work vehicle 10. This allows the work vehicle 10 to perform various types of work using each work machine 14. FIG. 2 illustrates a case where the work machine 14 is a tiller. The work machine 14 may be supported in the work vehicle 10 by a lift mechanism, which is not illustrated, in a manner capable of lifting and lowering. The vehicle control device 11 can control the lift mechanism to lift and lower the work machine 14.

The steering wheel 137 is an operation device operated by the operator or the vehicle control device 11. For example, the travel device 13 changes the angle of the front wheels 132 by use of a hydraulic power steering mechanism (not illustrated) or the like in response to the operation of the steering wheel 137 by the operator or the vehicle control device 11, thereby changing the course direction of the work vehicle 10.

In addition to the steering wheel 137, the travel device 13 is equipped with a shift lever, an accelerator, brakes, and the like, which are not illustrated, that are operated by the vehicle control device 11. Furthermore, in the travel device 13, the gear of the transmission 134 is switched to forward gear, reverse gear, or the like in response to the operation of the shift lever by the vehicle control device 11, thereby switching the traveling mode of the work vehicle 10 to forward, reverse, and the like. Further, the vehicle control device 11 also controls the rotational frequency of the engine 131 by operating the accelerator. Additionally, the vehicle control device 11 also operates the brakes to stop the rotation of the front wheels 132 and the rear wheels 133 by use of an electromagnetic brake.

The positioning device 16 is a communication device equipped with the positioning control part 161, the storage part 162, the communication part 163, the positioning antenna 164, and the like. As illustrated in FIG. 2, for example, the positioning device 16 is installed above the cabin 18 in which the operator boards. That being said, the location of the positioning device 16 is not limited to the cabin 18. Furthermore, the positioning control part 161, the storage part 162, the communication part 163, and the positioning antenna 164 of the positioning device 16 may be dispersed in different positions in the work vehicle 10. Note that, as mentioned above, the battery is connected to the positioning device 16, and thus the positioning device 16 can operate even when the engine 131 is stopped. Additionally, a cell phone device, a smartphone, a tablet device, or the like, for example, may be substituted for the positioning device 16.

The positioning control part 161 is a computer system with one or a plurality of processors and a storage memory, such as a non-volatile memory or a RAM. The storage part 162 is a non-volatile memory or the like that stores a positioning control program for the positioning control part 161 to execute the positioning processing, as well as data such as positioning information and movement information. For example, the positioning control program is non-transiently recorded on a computer-readable recording medium, such as a CD, a DVD, or the like, which is read by a predetermined reading device (not illustrated) and stored in the storage part 162. Note that, the positioning control program may be downloaded from a server (not illustrated) to the positioning device 16 via a communication network and stored in the storage part 162.

The communication part 163 is a communication interface that connects the positioning device 16 to a communication network by cable or wirelessly, in order to execute data communication according to a predetermined communication protocol with external devices, such as a base station server, via the communication network.

The positioning antenna 164 is an antenna that receives radio waves (GNSS signals) transmitted from the satellite 20.

The positioning control part 161 calculates the current location of the work vehicle 10 on the basis of the GNSS signals that are received by the positioning antenna 164 from the satellite 20. For example, in a case where the work vehicle 10 autonomously travels in the field F, when the positioning antenna 164 receives radio waves (transmission time, trajectory information, etc.) transmitted from each of the plurality of satellites 20, the positioning control part 161 calculates the distance between the positioning antenna 164 and each satellite 20 and calculates the current position (latitude and longitude) of the work vehicle 10 based on the calculated distance. Alternatively, the positioning control part 161 may perform positioning using the real-time kinematic method (the RTK-GPS positioning method "the RTK method"), which calculates the current position of the work vehicle 10 using correction information corresponding to a base station (a reference station) near the work vehicle 10. In this way, the work vehicle 10 uses positioning information based on the RTK method to perform autonomous travel. Note that the current position of the work vehicle 10 may be the same as the positioning position (for example, the position of the positioning antenna 164), or may be a position that deviates from the positioning position.

The operation device 17 is a device operated by the operator boarding the work vehicle 10, and displays various types of information, accepts operator operations, and the like. Specifically, the operation device 17 displays various setting screens to accept various setting operations from the operator and displays information about the work vehicle 10 while traveling. A specific configuration of the operation device 17 is described hereinafter.

The vehicle control device 11 includes control devices such as a CPU, ROM, RAM, and the like. The CPU is a processor that executes various types of calculation processes. The ROM is a non-volatile storage part where control programs such as a BIOS and an OS are stored in advance for the CPU to execute various types of calculation processes. The RAM is a volatile or non-volatile storage part that stores various types of information and is used as a temporary storage memory (work area) for various processes performed by the CPU. Furthermore, the vehicle control device 11 controls the work vehicle 10 by the CPU executing various control programs stored in advance in the ROM or the storage part 12. In addition, the vehicle control device 11 executes various processes according to the autonomous travel program with the CPU.

Specifically, the vehicle control device 11 controls the travel of the work vehicle 10. For example, the vehicle control device 11 causes the work vehicle 10 to travel manually based on the operator's operation (manual steering) in a case where the travel mode of the work vehicle 10 is manual travel (manual travel mode). For example, the vehicle control device 11 obtains operation information corresponding to driving operations by the operator, such as a steering wheel operation, a gearshift operation, a shift operation, an accelerator operation, a brake operation, or the like, and causes the travel device 13 to execute travel actions based on the operation information.

Further, in a case where the traveling mode of the work vehicle 10 is autonomous travel (autonomous travel mode), the vehicle control device 11 causes the work vehicle 10 to travel autonomously based on position information (positioning information) indicating the current position of the work vehicle 10, whose position is measured by the positioning control part 161. For example, when the work vehicle 10 meets the conditions for starting autonomous travel and obtains a travel start instruction from the operator, the vehicle control device 11 starts the autonomous travel of the work vehicle 10 based on the positioning information. Further, the vehicle control device 11 causes the work vehicle 10 to travel autonomously according to the target route R (straight route) generated in advance.

In addition, the vehicle control device 11 switches the travel mode to manual travel when the work vehicle 10 reaches the ending point of the straight route. The vehicle control device 11 may switch the travel mode to manual travel when it has determined that the work vehicle 10 has reached the ending point, or may switch the travel mode to manual travel in response to the operator's operation. When the travel mode is switched to manual travel, for example, the operator makes the work vehicle 10 perform turning traveling (manual travel) by manual steering. Note that the ending point position of each work route may be: a position internally at a predetermined distance from an end of the field F; a position specified in advance by the operator; a position in line with the position where the operator switched from autonomous travel to manual travel on the immediately prior worked route (a position where the work route intersects with a line which passes through the position where the switch to manual was performed and is perpendicular to the worked route, or, alternatively, a position where the work route intersects with a line which passes through the position where the switch to manual was performed and is parallel to an edge side of the field F); a position where the work route intersects with a line which passes through point B of the reference line L1 and is perpendicular to the reference line L1; etc.

As described above, the vehicle control device 11 switches the travel mode according to the operation by the operator on the operation device 17 to cause the work vehicle 10 to travel autonomously on a straight route (target route R) by autonomous steering and to travel manually on a turning route by manual steering.

[Operation Device 17]

As illustrated in FIG. 1, the operation device 17 is equipped with the operation control part 71, the storage part 72, and the operation display part 73, and the like. The operation device 17 may be a device that can be attached to or detached from the work vehicle 10. Alternatively, the operation device 17 may be a portable terminal (a tablet device, a smartphone, or the like) that can be carried by the operator. Further, the operation device 17 is communicably connected to the vehicle control device 11 by cable or wirelessly.

The operation display part 73 is a user interface equipped with a display part that displays various types of information, such as a liquid crystal display or an organic EL display, and an operation part that accepts operations, such as an operation button or a touch panel. The operation display part 73 displays various setting screens and work screens in response to instructions from the operation control part 71. Further, the operation display part 73 accepts the operator's operations on the setting screens and work screens.

Further, the operation part also includes an autonomous travel button for the operator to provide a travel start instruction for causing the work vehicle 10 to start traveling autonomously, a shift button for providing a correction operation (a shift operation) to correct the position deviation between the work vehicle 10 and the target route R, and a plurality of selection buttons for providing selection operations on the setting screen D1 and the travel screen D2 (none being illustrated). These operation buttons may be physical buttons or electronic image buttons displayed on a touch panel.

Figure 3:
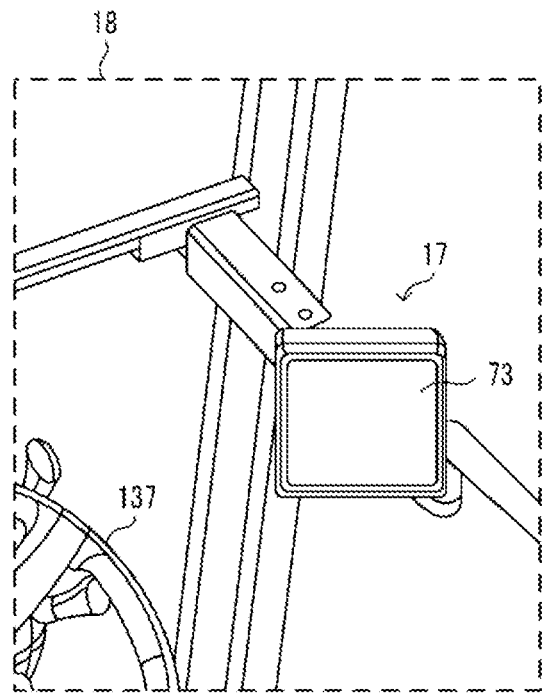
FIG. 3 is an external view diagram illustrating an example of an operation device according to the embodiment of the present invention.

The operation device 17 is, for example, as illustrated in FIG. 2 and FIG. 3, installed near the steering wheel 137 in the cabin 18.

The storage part 72 is a non-volatile storage part, such as an HDD, an SSD, or the like, that stores various types of information. The storage part 72 stores control programs, such as an autonomous travel program, to cause the operation device 17 to execute the autonomous travel process (see FIG. 13) described hereinafter. For example, the autonomous travel program is non-transiently recorded on a computer-readable recording medium, such as a CD, a DVD, or the like, which is read by a predetermined reading device (not illustrated) and stored in the storage part 72. Note that the autonomous travel program may be downloaded from a server (not illustrated) to the operation device 17 via a communication network and stored in the storage part 72. Further, the autonomous travel program may be stored in the storage part 12 of the work vehicle 10. In addition, the storage part 72 may also store the data of the target route R generated in the operation device 17. Note that the autonomous travel program may include a route generation program that generates a target route.

The operation control part 71 has control devices such as a CPU, ROM, RAM, and the like. The CPU is a processor that executes various types of calculation processes. The ROM is a non-volatile storage part where control programs such as a BIOS and an OS are stored in advance for the CPU to execute various types of calculation processes. The RAM is a volatile or non-volatile storage part that stores various types of information and is used as a temporary storage memory (work area) for various processes performed by the CPU. Furthermore, when the CPU executes the various control programs, which are stored in the ROM or the storage part 72 in advance, the operation control part 71 controls the operation device 17.

More specifically, as illustrated in FIG. 1, the operation control part 71 includes various processing parts such as the display processing part 711, the acceptance processing part 712, the generation processing part 713, and the change processing part 714. Note that, by executing various processes with the CPU in accordance with the autonomous travel program, the operation device 17 functions as the various processing parts. Further, part or all of the processing parts may be configured with an electric circuit. Note that the autonomous travel program may be a program to cause a plurality of processors to function as the processing parts.

Figure 5A:
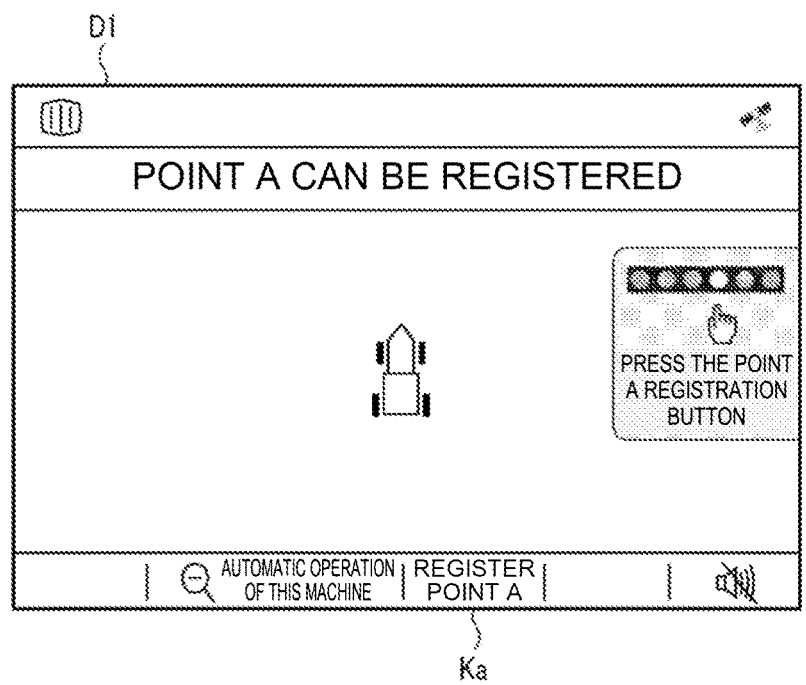
FIG. 5A is a diagram illustrating an example of a setting screen displayed on the operation device according to the embodiment of the present invention.
Figure 5B:
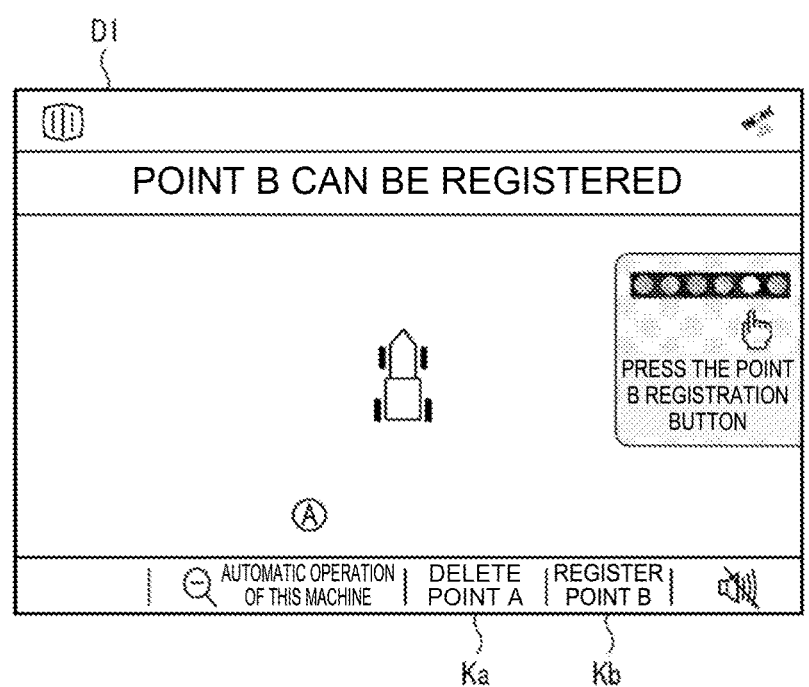
FIG. 5B is a diagram illustrating an example of the setting screen displayed on the operation device according to the embodiment of the present invention.

The display processing part 711 causes the operation display part 73 to display various types of information. For example, the display processing part 711 causes the operation display part 73 to display a setting screen for performing various settings (for example, the setting screen D1 in FIGS. 5A and 5B), a travel screen including travel information such as the traveling status, the working status, etc., of the work vehicle 10 (for example, the travel screen D2 in FIG. 12), and the like.

The acceptance processing part 712 accepts various types of operations by the operator. For example, on the setting screen, the acceptance processing part 712 accepts operations to generate the target route R, that is, the various types of operations from the operator relating to the route generation work.

The generation processing part 713 generates the target route R which includes the reference line L1 that is set according to the operator's setting operation. Specifically, the generation processing part 713 generates the target route R including a plurality of straight routes that are arranged with equal interval spacing based on the reference line L1 passing through point A (the first reference point) and point B (the second reference point) in the field F. The generation processing part 713 is an example of the generation processing part in the present invention.

An example of a procedure for generating the target route R is described below. For example, the display processing part 711 causes the operation display part 73 to display the setting screen D1 (see FIG. 5A), which accepts the setting operation from the operator to set the reference line L1. The operator moves the work vehicle 10 to a given position in the field F and presses the point A registration button Ka. For example, the operator moves the work vehicle 10 to an outer peripheral end of the field F and presses the point A registration button Ka. When the operator presses the point A registration button Ka, the generation processing part 713 registers the current position of the work vehicle 10 as the first reference point (point A). When the generation processing part 713 registers point A, the display processing part 711 causes the operation display part 73 to display the setting screen D1 (see FIG. 5B), on which the registration operation of the second reference point (point B) is accepted. The operator manually makes the work vehicle 10 travel in the direction (the target direction) the work vehicle 10 is desired to travel and work in (see FIG. 6A). Specifically, the operator makes the work vehicle 10 travel straight in a direction parallel to the working direction (for example, the tilling direction) in which the work vehicle 10 perform work in the work area. Then, the operator presses the point B registration button Kb (see FIG. 5B) at a given position (for example, an outer peripheral end of the field F). When the operator presses the point B registration button Kb, the generation processing part 713 registers the current position of the work vehicle 10 as the second reference point (point B).

Figure 6A:
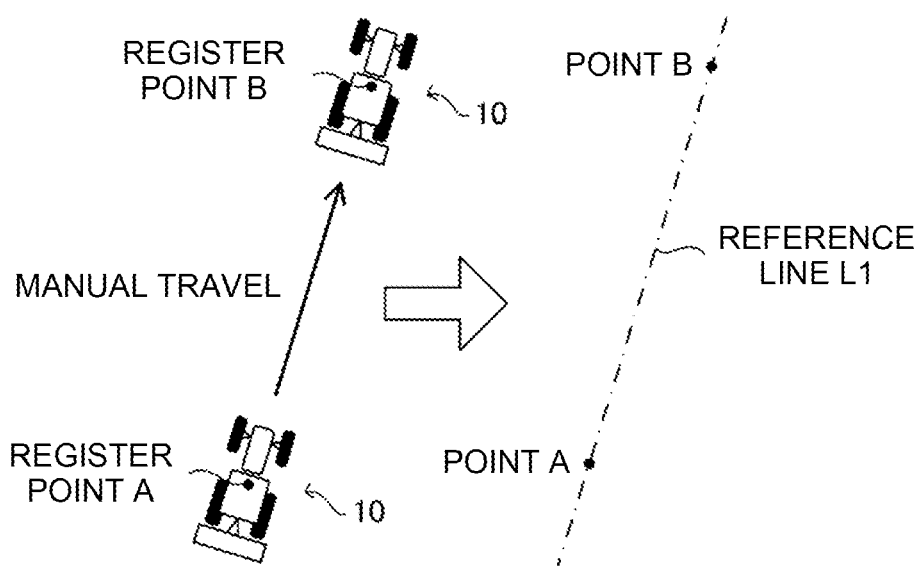
FIG. 6A is a diagram to explain a route generation method according to the embodiment of the present invention.

Once the generation processing part 713 obtains the position information of point A and point B, a straight line passing through point A and point B is set as the reference line L1 (see FIG. 6A). Note that the generation processing part 713 may be able to adjust the orientation of the created reference line L1. For example, the generation processing part 713 causes the setting screen D1 to display the created reference line L1 and sets (registers) the reference line L1 in a case where the registration operation from the operator is accepted. Alternatively, when the generation processing part 713 accepts an operation from the operator to change the orientation of the reference line L1 (for example, a screen touch operation or the like), the orientation of the reference line L1 is adjusted according to the operation. In a case where the operation to register point B is accepted, the generation processing part 713 may cause a selection screen for registering or adjusting the reference line L1 to be displayed.

Figure 6B:
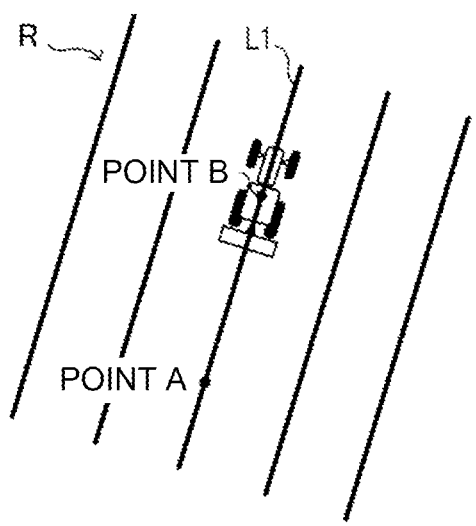
FIG. 6B is a diagram to explain the route generation method according to the embodiment of the present invention.

The generation processing part 713 generates a travel route (the target route R) that includes the reference line L1 and a plurality of straight lines parallel to the reference line L1. For example, the generation processing part 713 generates a plurality of parallel straight lines based on the preset work width (the horizontal width of the work machine 14) and wrap width (width overlapping the adjacent worked area), spaced at equal intervals to the left and right of the reference line L1 at the center (see FIG. 6B). The generation processing part 713 registers the generated target route R in the storage part 72 and causes the operation display part 73 to display it.

According to the method described above, the target route R can be generated by the reference line L1 passing through two points (point A and point B) at both ends of the field F, thus improving the accuracy of work by the work vehicle 10. Note that the generation processing part 713 may be able to register point B in a case where the work vehicle 10 has traveled a predetermined distance (for example, 5 meters) after registering point A. In this way, a more accurate reference line L1 can be set.

After the target route R is generated, the operator instructs the work vehicle 10 to start autonomous traveling in the field F (a travel start instruction). For example, in a case where the work vehicle 10 meets the conditions for starting autonomous travel and thus is in a state where autonomous travel is possible, such as when the work vehicle 10 is within a predetermined distance from the target route R and within a predetermined orientation relative to the target route R (see FIG. 6C), the operator can press an autonomous travel button (not illustrated) on the operation display part 73 to perform the travel start instruction.

Figure 6C:
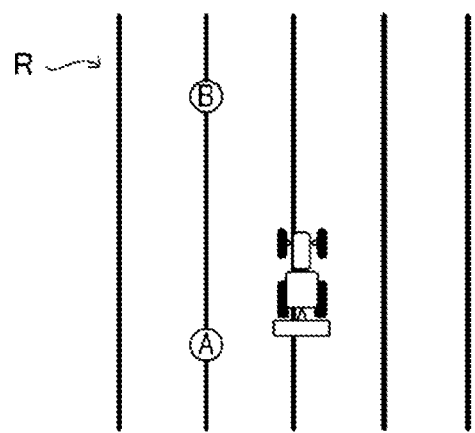
FIG. 6C is a diagram to explain the route generation method according to the embodiment of the present invention.

When the operator performs the travel start instruction, the vehicle control device 11 accepts the travel start instruction and starts autonomous steering of the work vehicle 10 so that the work vehicle 10 follows the target route R (see FIG. 6C). In this manner, the vehicle control device 11 causes the work vehicle 10 to travel autonomously along a straight route of the target route R by autonomous steering.

At such a time, while the work vehicle 10 is traveling autonomously, changing the travel direction (orientation) from the target route R according to the condition of the field F, traveling status, etc., may be desired. In this case, in a case where the target route R is configured with a plurality of straight routes parallel to the reference line L1 as described above (see FIG. 6B), if the orientation of the straight route that the work vehicle 10 is currently traveling is changed, the orientation of all straight routes is changed accordingly, and thus the interval spacing between each of the plurality of straight routes is changed.

Figure 7:
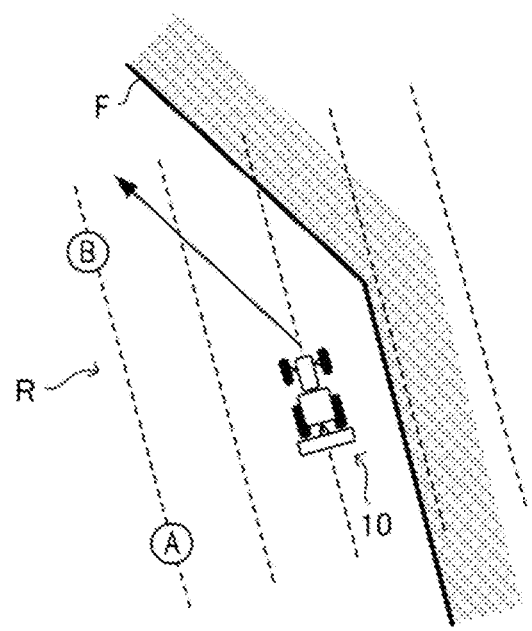
FIG. 7 is a diagram illustrating a specific example where the target route would need to be changed according to the embodiment of the present invention.
Figure 8:
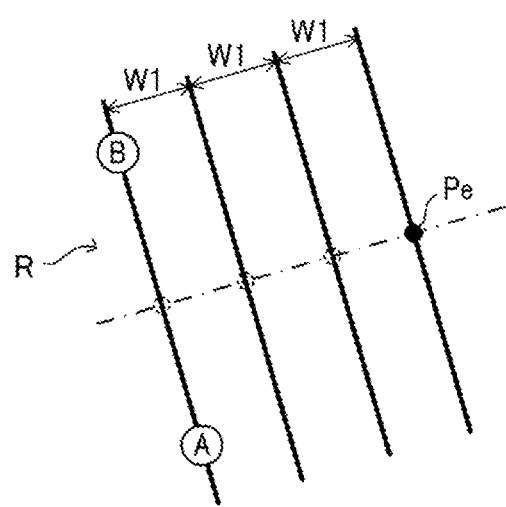
FIG. 8 is a diagram illustrating an example of the target route according to the embodiment of the present invention.
Figure 9:
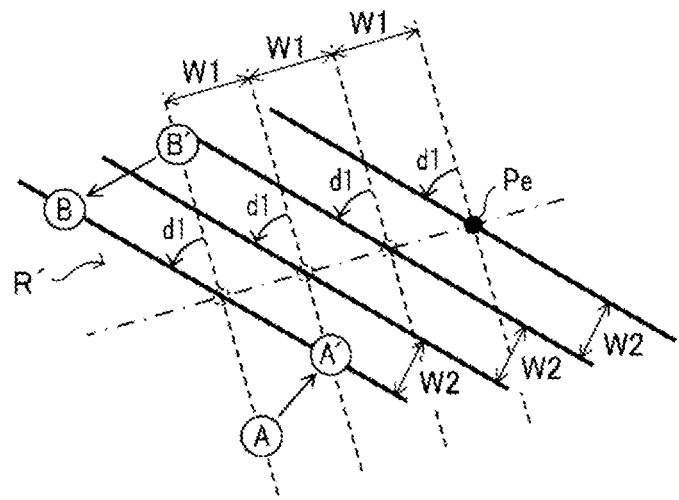
FIG. 9 is a diagram illustrating an example of a conventional method for changing the orientation of a target route.

For example, as illustrated in FIG. 7, in a case where the field F has a slant with respect to the orientation of the target route R, it is necessary to change the travel orientation of the work vehicle 10 to the direction of the arrow (the left direction) to work in line with the shape of the field F. In FIG. 8, the target route R and the current position Pe of the work vehicle 10 before the change in orientation is illustrated. In FIG. 9, as an example of a conventional method of changing the orientation of the target route R, the target route R' after a change of the orientation is illustrated. As illustrated in FIG. 9, if the orientation of the straight route corresponding to the current position Pe in the target route R is changed by the angle d1, each of the plurality of straight routes rotates by the angle d1 about the position corresponding to the current position Pe. In this way, when each of the plurality of straight routes is individually rotated by the angle d1, the interval spacing between each of the plurality of straight routes becomes W2, which does not match the working width W1 (W2<W1). This makes it difficult for the work vehicle 10 to properly travel and work autonomously.

In contrast, as shown below, the operation device 17 in the present embodiment is equipped with a configuration that enables the work vehicle 10 to travel autonomously in an appropriate manner even in a case where the orientation of the target route R including a plurality of straight routes is changed.

Specifically, in a case of changing the orientation of the target route R, the change processing part 714 maintains the interval spacing between each of the plurality of straight routes at the same length as the interval spacing in the target route R before the change in orientation. In other words, the change processing part 714 changes the orientation of the target route R so that the width W1 of the straight routes in the target route R generated based on point A and point B does not change. The change processing part 714 is an example of the change processing part of the present invention.

Figure 10:
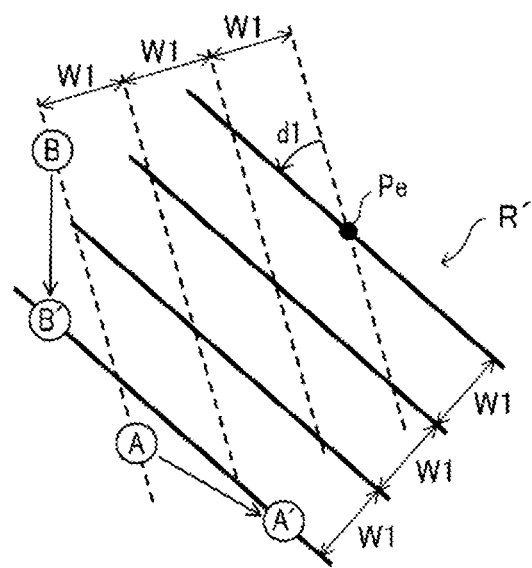
FIG. 10 is a diagram illustrating an example of a method for changing the orientation of a target route according to the embodiment of the present invention.

For example, in a case where the acceptance processing part 712 accepts a change operation from the operator to change the orientation of the target route R when the work vehicle 10 is traveling autonomously according to the target route R or when the work vehicle 10 is stopped while traveling autonomously, the change processing part 714 maintains the interval spacing W1 of each of a plurality of straight routes while changing the orientation of each of the plurality of straight routes. For example, as illustrated in FIG. 10, in a case where the acceptance processing part 712 accepts a change operation from the operator to change the orientation of the target route R by the angle d1, the change processing part 714 rotates the plurality of straight routes as a whole by the angle d1 about the current position Pe of the work vehicle 10. In this way, the interval spacing between the plurality of straight routes in the target route R before the change of the orientation (see FIG. 10) and the interval spacing between the plurality of straight routes in the target route R' after the change of the orientation are not changed and are maintained as the same width W1. Note that the center of rotation of the target route R is not limited to the current position Pe of the work vehicle 10, and may also be a position specified by the operator. In this case, the travel orientation is changed when the work vehicle 10 reaches the position specified by the operator.

Note that there are cases where, if the positioning accuracy degrades under the autonomous travel mode (while traveling autonomously or while stopped), the work vehicle 10 may deviate from the target route R. In this case, the change processing part 714 may rotate the target route R by the angle d1 about the corresponding position on the straight route of the target route R closest from the current position of the work vehicle 10 (the intersection point with the straight line perpendicular to the straight route closest from the current position).

As another embodiment, in a case where the acceptance processing part 712 accepts a change operation from the operator to change the orientation of the target route R by the angle d1 when the work vehicle 10 is traveling manually or when the work vehicle 10 is stopped during manual travel, the change processing part 714 may rotate the plurality of straight routes as a whole by the angle d1. For example, the change processing part 714 may perform the rotation by the angle d1 about the current position of the work vehicle 10 in a case where the work vehicle 10 is on the target route R. As another example, in a case where the work vehicle 10 is not on the target route R, the change processing part 714 may perform the rotation by the angle d1 about the corresponding position on the straight route of the target route R closest from the current position of the work vehicle 10 (the intersection point with the straight line perpendicular to the straight route closest from the current position). As described above, the change processing part 714 may rotate a plurality of straight routes as a whole in a case where a change operation to change the orientation of the target route R is accepted, regardless of whether the travel mode is autonomous travel mode or manual travel mode.

As another embodiment, in a case where the acceptance processing part 712 accepts a change operation from the operator to change the orientation of the target route R when the work vehicle 10 is traveling manually, the change processing part 714 may change the orientation of each of the plurality of straight routes while maintaining the interval spacing W1 of each of the plurality of straight routes. In other words, the change processing part 714 may change the orientation of the target route R when the work vehicle 10 is traveling autonomously as well as traveling manually.

Figure 12:
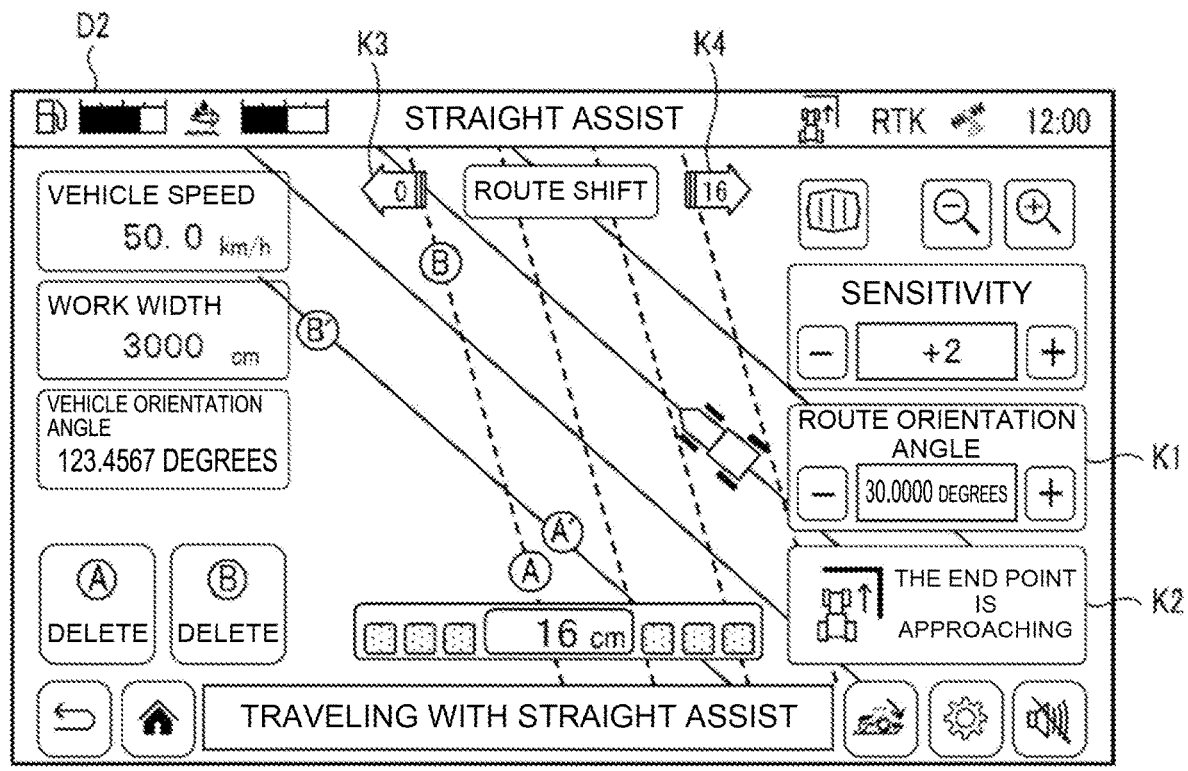
FIG. 12 is a diagram illustrating an example of a travel screen displayed on the operation device according to the embodiment of the present invention.

At such a time, the operator can change the orientation of the target route R to a given angle with the operation device 17. In FIG. 12, an example of the travel screen D2 of the operation device 17 is illustrated. The travel screen D2 displays various types of information about the current traveling status of the work vehicle 10. In addition, the display processing part 711 displays the orientation change button K1, which accepts operations to change the orientation of the target route R (route orientation angle), on the travel screen D2. When the operator wants to change the travel direction of the work vehicle 10, the operator operates the orientation change button K1 on the travel screen D2 to change the orientation of the target route R. For example, in a case of changing the travel orientation of the work vehicle 10 to the left, the operator presses the "—" button on the orientation change button K1, and, in a case of changing the travel orientation of the work vehicle 10 to the right, the operator presses the "+" button on the orientation change button K1. The display processing part 711 increases or decreases the value of the route orientation angle on the travel screen D2 in response to the operations of the orientation change button K1.

The acceptance processing part 712 accepts the operation of the orientation change button K1 (corresponding to the change operation), and the change processing part 714 changes the orientation of the target route R in response to the operation. When the change processing part 714 changes the orientation of the target route R, the display processing part 711 displays the target route R' after the orientation change on the travel screen D2 (see FIG. 12).

Further, in a case where the orientation of the target route R is changed, the change processing part 714 sets point A and point B on the changed target route R'. For example, as illustrated in FIG. 10, among the plurality of straight routes included in the target route R', point A and point B are reset to the positions corresponding to the straight route where point A and point B were registered in the original target route R. In other words, the change processing part 714 resets point A and point B to the positions rotated by the angle d1. This allows the operator to confirm the positions of point A and point B on the travel screen D2, even on the target route R' after the orientation has been changed. Note that, on the travel screen D2, the display processing part 711 may indicate the point A that is set for the target route R' as "A'" and the point B that is set for the target route R' as "B'" (see FIG. 10). This allows the operator to confirm that point A and point B have been reset (moved).

At such a time, if the orientation of the target route R is changed when the work vehicle 10 is at a position distant from point A and point B (the reference line L1), point A and point B may be out of the display area of the travel screen D2 and not displayed. Therefore, instead of the configuration illustrated in FIG. 10, when the orientation of the target route R is changed, the change processing part 714 resets the positions of point A and point B to predetermined positions independent of the angle d1, as illustrated in FIG. 11.

Figure 11:
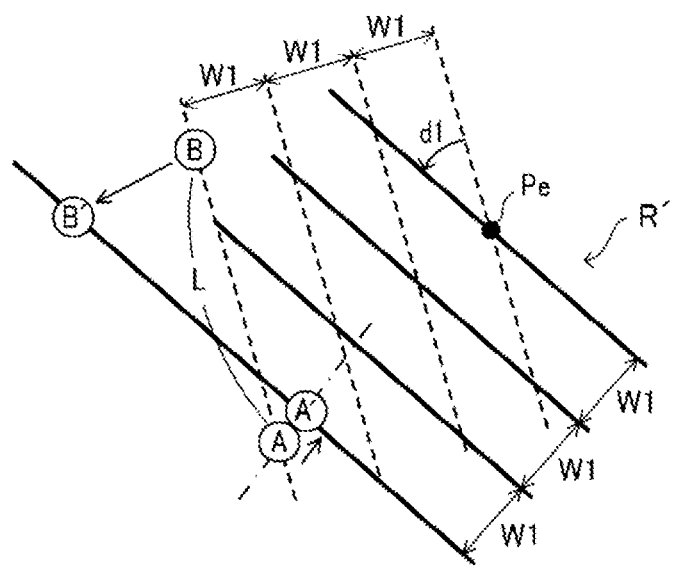
FIG. 11 is a diagram illustrating another example of a method of changing the orientation of the target route according to the embodiment of the present invention.

Specifically, as illustrated in FIG. 11, the change processing part 714 sets point A ("A'") as the intersection point where the straight route (the first straight route) which is in the target route R' after the orientation change and is the closest from the position of point A before the change intersects with the straight line passing through point A and perpendicular to that straight route. Further, the change processing part 714 sets point B ("B'") as the position at the distance L, which is the distance between point A and point B in the target route R before the change, from point A ("A'"), which is set at the intersection point. In this way, the operator can confirm the positions of point A ("A'") and point B ("W") which have been reset on the travel screen D2 (see FIG. 12).

Note that the change processing part 714 may set point B ("W") as the intersection point where the straight route which is in target route R' after the orientation change and is the closest from the position of point B before the change intersects with the straight line passing through point B and perpendicular to that straight route, and set point A ("A'") as the position at the distance L, which is the distance between point A and point B in the target route R before the change, from point B ("W"), which is set at the intersection point. In other words, the change processing part 714 may be configured to set the point closer to the corresponding straight route among point A and point B to the intersection point with the perpendicular straight line, and set the one farther from the corresponding straight route to the position in accordance with distance L.

Further, the change processing part 714 may set point A ("A'") as the intersection point where the straight route (the first straight route) which is in the target route R' after the orientation change and is the closest from the position of point A before the change intersects with the straight line passing through point A and perpendicular to that straight route, and set point B ("W") as the intersection point where the straight route (the first straight route) which is in the target route R' after the orientation change and is the closest from the position of point B before the change intersects with the straight line passing through point B and perpendicular to that straight route. In other words, the change processing part 714 may be configured to set both point A and point B at the respective intersection points where their nearby straight routes intersect with the perpendicular lines passing through point A and point B, respectively.

Additionally, in a case where the orientation of the target route R is changed, the display processing part 711 may display the target route R before the change and the target route R' after the change in a distinguishable manner on the travel screen D2. For example, the display processing part 711 may display the target route R and the target route R' illustrated in FIG. 10 or FIG. 11 on the travel screen D2 (see FIG. 12). This allows the operator to easily confirm the target route R before and after the change in orientation.

Note that the vehicle control device 11 may finish autonomous steering at the ending point of each straight route. For example, when the work vehicle 10 is traveling straight on a straight route by autonomous steering and approaches the position corresponding to the ending point of the worked (immediately prior) straight route adjacent to that straight route, the vehicle control device 11 informs the operator of the guidance information K2 (see FIG. 12), and finishes the autonomous steering in response to the operator's operation.

[Autonomous Travel Process]

Figure 13:
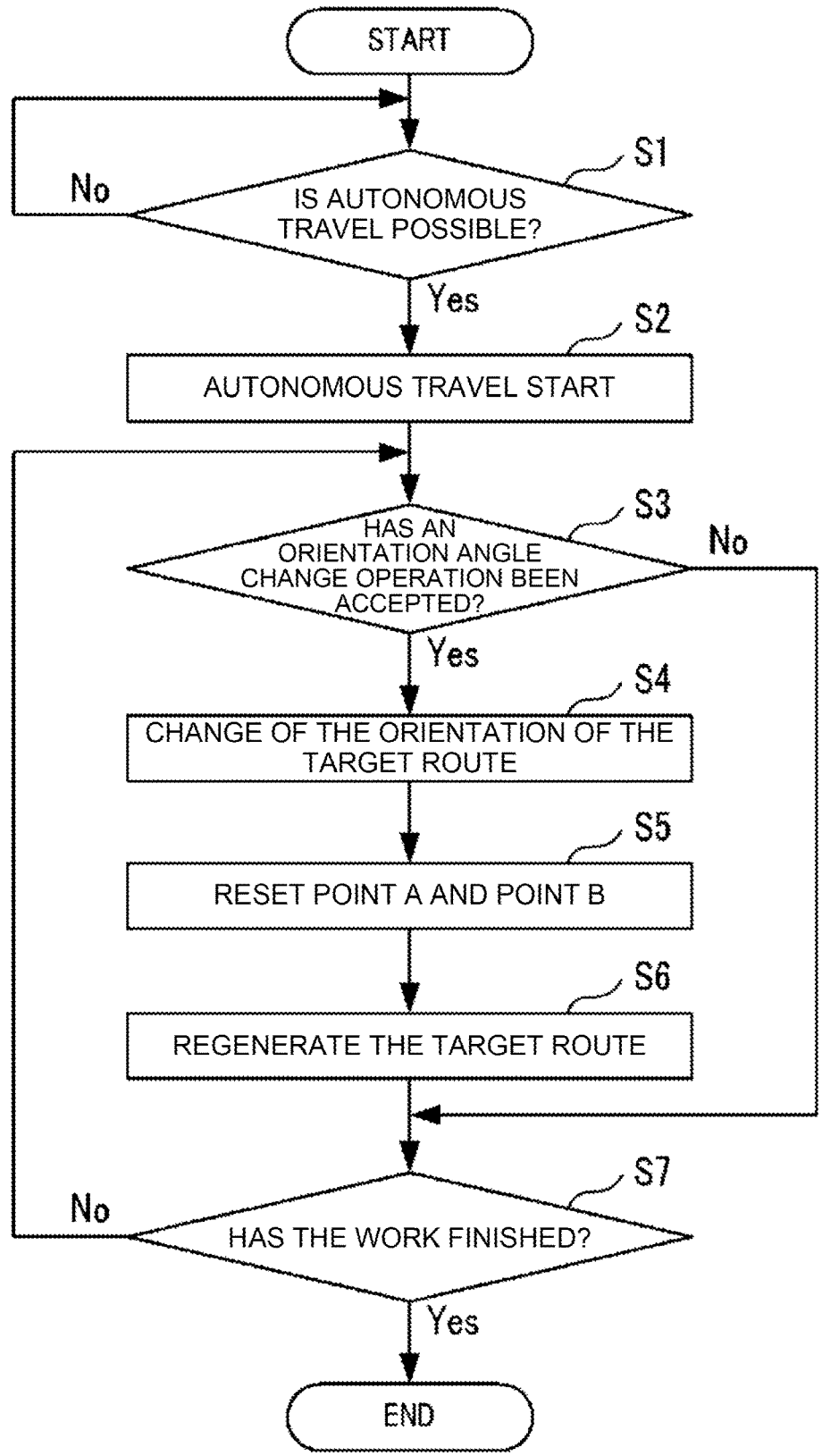
FIG. 13 is a flowchart illustrating an example of the procedure of an autonomous travel process to be executed by the work vehicle according to the embodiment of the present invention.

Hereinafter, while referencing FIG. 13, an example of the autonomous travel process executed by the vehicle control device 11 and the operation control part 71 of the operation device 17 is described. Note that the present invention may be viewed as an invention of an autonomous travel method in which the vehicle control device 11 and the operation device 17 execute part or all of the autonomous travel process, or as an invention of an autonomous travel program to cause the vehicle control device 11 and the operation device 17 to execute part or all of the autonomous travel method. Further, one or more processors may execute the autonomous travel process. In addition, the autonomous travel process includes a route generation process executed by the operation device 17. The route generation program of the present invention may be viewed as an invention of a route generation method in which the operation device 17 executes part or all of the route generation process, or as an invention of a route generation program to cause the operation device 17 to execute part or all of the route generation method.

In step S1, the vehicle control device 11 determines whether or not the work vehicle 10 is in a state where autonomous travel is possible. When the vehicle control device 11 determines that the work vehicle 10 is in a state where autonomous travel is possible (S1: Yes), the process proceeds to step S2. The vehicle control device 11 is on standby until the work vehicle 10 is in a state where autonomous travel is possible (S1: No). Specifically, in a case where the work vehicle 10 meets the autonomous travel start conditions, the vehicle control device 11 determines that the work vehicle 10 is in a state where autonomous travel is possible.

In step S2, the vehicle control device 11 causes the work vehicle 10 to start autonomous travel according to the target route R. Specifically, when the work vehicle 10 meets the autonomous travel start conditions and the operator performs a travel start instruction, the vehicle control device 11 starts the autonomous travel process according to the set target route R. For example, the vehicle control device 11 makes the work vehicle 10 travel autonomously by autonomous steering according to straight routes. Further, the vehicle control device 11 also makes the work vehicle 10 perform turning traveling in response to the operator's manual steering on turning routes. The vehicle control device 11 makes the work vehicle 10 travel in the field F while switching between autonomous travel on straight routes and manual travel on turning routes. Further, the vehicle control device 11 also drives the work machine 14 to execute a predetermined work (for example, tillage work) while the work vehicle 10 is traveling autonomously along a straight route.

Next, in step S3, the operation control part 71 determines whether or not a change operation to change the orientation of the target route R from the operator has been accepted. When the operation control part 71 accepts the change operation from the operator (S3: Yes), the process proceeds to step S4. On the other hand, in a case where the operation control part 71 has not accepted the change operation from the operator (S3: No), the process proceeds to step S7. For example, while the work vehicle 10 is traveling autonomously, if the operator performs an operation to change the route orientation angle by the angle d1 (see FIG. 11) by pressing the orientation change button K1 on the travel screen D2 (see FIG. 12), the operation control part 71 accepts said change operation (S3: Yes) and the process proceeds to step S4.

In step S4, the operation control part 71 changes the orientation of the target route R. Specifically, the operation control part 71 changes the orientation of each of the plurality of straight routes included in the target route R while maintaining the interval spacing of each of the plurality of straight routes at the same length (W1) of the interval spacing of the target route R before the orientation change. For example, as illustrated in FIG. 11, the operation control part 71 rotates the plurality of straight routes as a whole by the angle d1 about the current position Pe of the work vehicle 10.

Next, in step S5, the operation control part 71 resets point A and point B, which define the reference line L1. For example, as illustrated in FIG. 11, the operation control part 71 sets point A ("A'") as the intersection point where the straight route which is in the target route R' after the orientation change and is the closest from the position of point A before the change intersects with the straight line passing through point A and perpendicular to that straight route. Further, the operation control part 71 sets point B ("B'") as the position at the distance L, which is the distance between point A and point B in the target route R before the change, from point A ("A'"), which is set at the intersection point.

Next, in step S6, the operation control part 71 regenerates the target route. Specifically, the operation control part 71 regenerates the target route R' (see FIG. 11), which is obtained by rotating the target route R by the angle d1. When the operation control part 71 changes the target route R (regenerates the target route R'), the vehicle control device 11 causes the work vehicle 10 to travel autonomously according to the changed target route R'.

Next, in step S7, the vehicle control device 11 determines whether or not the work vehicle 10 has finished the work. When the vehicle control device 11 determines that the work vehicle 10 has finished the work (S7: Yes), the vehicle control device 11 ends the above autonomous travel process. If the vehicle control device 11 determines that the work vehicle 10 has not finished the work (S7: No), the vehicle control device 11 causes the work vehicle 10 to continue traveling autonomously according to the target route (the target route R or the target route R') and proceeds the process to step S3.

The vehicle control device 11 and the operation control part 71 repeat the processes of the above steps S3 to S6 until the work vehicle 10 finishes the work.

In the above-described way, the vehicle control device 11 and the operation control part 71 execute the autonomous travel process.

As described above, the work vehicle 10 according to the present embodiment generates the target route R including a plurality of straight routes arranged at equal interval spacing, based on the reference line L1 passing through point A and point B in the field F, and, in a case where the orientation of the target route R is changed, the interval spacing of each of the plurality of straight routes is maintained at the same length as the interval spacing in the target route R before the change in orientation. In other words, the work vehicle 10 changes the orientation (the route orientation angle) of the target route R while maintaining the interval spacing W1 of each of the plurality of straight routes (see FIG. 10 and FIG. 11).

According to the above-described configuration, even in a case where the orientation of the target route R of the work vehicle 10 is changed, the interval spacing between each of the plurality of straight routes is unchanged and maintained at the working width, thus enabling the work vehicle 10 to travel autonomously in an appropriate manner. Therefore, it is possible for the work vehicle 10 to travel autonomously and work on the plurality of straight routes in a precise manner according to the work width.

OTHER EMBODIMENTS

The present invention is not limited to the embodiment described above. Hereinafter, other embodiments of the present invention are described.

The work vehicle 10 may be equipped with a function to correct a positional shift (a route offset function) in a case where a lateral positional shift (a positional deviation) relative to the target route R has occurred. For example, the operator can correct the position of the work vehicle 10 to the left or right by pressing the left shift button K3 or the right shift button K4 on the travel screen D2 (see FIG. 12) to shift the target route R in the left or right direction.

Figure 14:
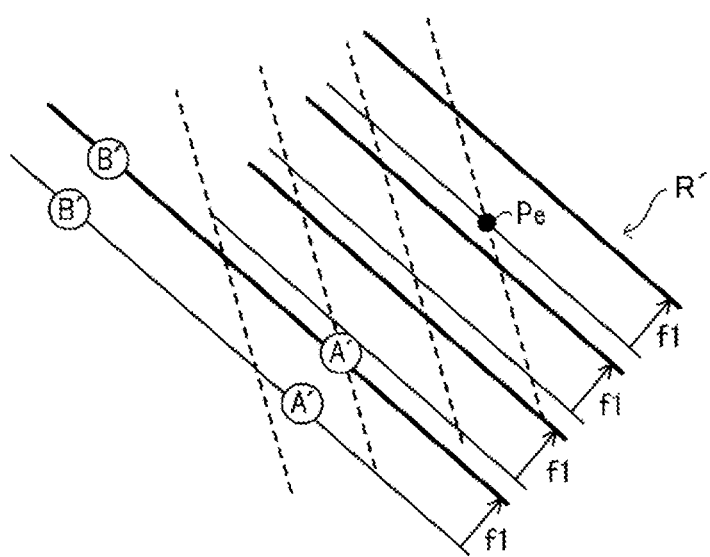
FIG. 14 is a diagram illustrating a method for correcting the position of the target route according to the embodiment of the present invention.

At such a time, in a case where the operation to correct the lateral position relative to the target route of the work vehicle 10 is accepted, the operation control part 71 corrects the lateral position with respect to the target route R' whose orientation has been changed. For example, as illustrated in FIG. 14, the operation control part 71 shifts the modified target route R', where the orientation of the target route R has been changed, by f1 (cm) to the right in response to the operator's operation. In this way, in a state where the working width is maintained, it is possible to shift the target route in the lateral direction while changing the orientation of the target route. This allows the work vehicle 10 to travel autonomously in an appropriate manner.

Although the operation control part 71 is configured to generate the target route R based on point A and point B in the above-described embodiment, the method for generating the target route R in the present invention is not limited to this. As another embodiment, the operation control part 71 may generate the target route R based on the reference line L1 passing through a reference point (point A) which is set at a position of the work vehicle 10 in the field F (for example, the current position) and extending in the direction of a set orientation angle (a set angle) which is set according to a setting operation of the operator, or may generate the target route R based on the reference line L1 passing through a reference point (point A) which is set at a position of the work vehicle 10 in the field F (for example, the current position) and extending in the direction of the orientation of the work vehicle 10 (the vehicle orientation). Note that, with these methods, the operation control part 71 may also generate the target route R by setting point B as a position at a predetermined distance from point A in the reference line L1.

Note that the work vehicle 10 may also be able to travel autonomously when turning. In this case, the target route R includes straight routes as well as turning routes. Further, in the work vehicle 10, the operator may be able to switch between autonomous travel and manual travel for turning. Further, the work vehicle 10 may also be able to travel autonomously on the target route R unmanned. In this case, the operator may remotely control the operation terminal to perform the travel start instruction or the like. Further, the operation terminal that is used for the remote control may be the operation device 17 according to the present embodiment or may include each of the processing parts in the operation device 17.

The route generation system in the present invention may be configured with the operation device 17 alone, or may be configured with a server equipped with each processing part included in the operation device 17. Further, the route generation system may be configured with the work vehicle 10 equipped with the operation device 17.

SUPPLEMENTARY NOTES OF THE INVENTION

The following are supplementary notes of a summary of the invention extracted from the embodiments. Note that the respective components and processing functions described in the following supplementary notes can be selected and combined as desired.

Supplementary Note 1

A route generation method for executing: generating a target route, based on a reference line which passes through a first reference point and a second reference point within a work area, the target route including a plurality of straight routes arranged at equal interval spacing; and, maintaining the interval spacing of each of the plurality of straight routes in a case where an orientation of the target route is changed, at the same length as the interval spacing of the target route before the change in orientation.

Supplementary Note 2

The route generation method according to Supplementary Note 1, wherein, in a case where a change operation to change the orientation of the target route is accepted, the orientation of each of the plurality of straight routes is changed while maintaining the interval spacing of each of the plurality of straight routes.

Supplementary Note 3

The route generation method according to Supplementary Note 1 or 2, wherein, when a work vehicle is traveling autonomously according to the target route or when the work vehicle is stopped while traveling autonomously, in a case where the change operation to change the orientation of the target route is accepted, the orientation of each of the plurality of straight routes is changed while maintaining the interval spacing of each of the plurality of straight routes.

Supplementary Note 4

The route generation method according to Supplementary Note 2 or 3, wherein, in a case the change operation is accepted, the plurality of straight routes as a whole are rotated about a current position of a work vehicle by an angle corresponding to the change operation.

Supplementary Note 5

The route generation method according to any one of Supplementary Notes 1 to 4, wherein, in a case where the orientation of the target route is changed, the first reference point and the second reference point are set on the target route after the change.

Supplementary Note 6

The route generation method according to Supplementary Note 5, wherein the first reference point is set at an intersection point where a first straight route intersects with a straight line which passes through the first reference point and is perpendicular to the first straight route, the first straight route being within the target route after the change and being the closest from the first reference point before the change, and the second reference point is set at a position distant from the first reference point, which is set at the intersection point, by a distance between the first reference point and the second reference point in the target route before the change, or is set at an intersection point where a first straight route intersects with a straight line which passes through the second reference point and is perpendicular to the first straight route, the first straight route being within the target route after the change and being the closest from the second reference point before the change.

Supplementary Note 7

The route generation method according to any one of Supplementary Notes 1 to 6, wherein, in a case where the orientation of the target route is changed, the target route before the change and the target route after the change are displayed in a distinguishable manner on an operation terminal.

Supplementary Note 8

The route generation method according to any one of Supplementary Notes 1 to 7, wherein, in a case where an operation to correct a lateral position of a work vehicle relative to the target route is accepted, the lateral position is corrected relative to the target route whose orientation has been changed.

REFERENCE SIGNS LIST

1 Autonomous travel system
10 Work vehicle
11 Vehicle control device
12 Storage part
13 Travel device
14 Work machine
15 Communication part
16 Positioning device
17 Operation device
71 Operation control part
711 Display processing part
712 Acceptance processing part
713 Generation processing part
714 Change processing part
D1 Setting screen
D2 Travel screen F Field (work area)
K1 Orientation change button
L1 Reference line
R Target route
R' Target route
W1 Work width
d1 Angle (route orientation angle)

The invention claimed is:

1. A route generation method comprising:
generating a target route based on a reference line which passes through a first reference point and a second reference point within a work area, the target route including a plurality of straight routes arranged at equal interval spacing; and
in a case where an orientation of the target route is changed, maintaining the interval spacing of each of the plurality of straight routes at the same length as the interval spacing of the target route before the change in orientation.

2. The route generation method according to claim 1, wherein, in a case where a change operation to change the orientation of the target route is accepted, the orientation of each of the plurality of straight routes is changed while maintaining the interval spacing of each of the plurality of straight routes.

3. The route generation method according to claim 2, wherein, when a work vehicle is traveling autonomously according to the target route or when the work vehicle is stopped while traveling autonomously, in a case where the change operation to change the orientation of the target route is accepted, the orientation of each of the plurality of straight routes is changed while maintaining the interval spacing of each of the plurality of straight routes.

4. The route generation method according to claim 2, wherein, in a case the change operation is accepted, the plurality of straight routes as a whole are rotated about a current position of a work vehicle by an angle corresponding to the change operation.

5. The route generation method according to claim 1, wherein, in a case where the orientation of the target route is changed, the first reference point and the second reference point are set on the target route after the change.

6. The route generation method according to claim 5, wherein:
the first reference point is set at an intersection point where a first straight route intersects with a straight line which passes through the first reference point and is perpendicular to the first straight route, the first straight route being within the target route after the change and being the closest from the first reference point before the change, and
the second reference point is set at a position distant from the first reference point, which is set at the intersection point, by a distance between the first reference point and the second reference point in the target route before the change, or is set at an intersection point where a first straight route intersects with a straight line which passes through the second reference point and is perpendicular to the first straight route, the first straight route being within the target route after the change and being the closest from the second reference point before the change.

7. The route generation method according to claim 1, wherein, in a case where the orientation of the target route is changed, the target route before the change and the target route after the change are displayed in a distinguishable manner on an operation terminal.

8. The route generation method according to claim 1, wherein, in a case where an operation to correct a lateral position of a work vehicle relative to the target route is accepted, the lateral position is corrected relative to the target route whose orientation has been changed.

9. A route generation system comprising:
one or more processors; and
a memory storing processor-executable code, which when executed by the one or more processors, causes the one or more processors to:
generate a target route based on a reference line which passes through a first reference point and a second reference point within a work area, the target route including a plurality of straight routes arranged at equal interval spacing; and
in a case where an orientation of the target route is changed, maintain the interval spacing of each of the plurality of straight routes at the same length as the interval spacing of the target route before the change in orientation.

10. A non-transitory, computer-readable medium storing a route generation program including instructions that, when executed by one or more processors, cause the one or more processors to:
generate a target route based on a reference line which passes through a first reference point and a second reference point within a work area, the target route including a plurality of straight routes arranged at equal interval spacing; and
in a case where an orientation of the target route is changed, maintain the interval spacing of each of the plurality of straight routes at the same length as the interval spacing of the target route before the change in orientation.

* * * * *